United States Patent [19]

Hartsock

[11] 4,076,039

[45] Feb. 28, 1978

[54] SIGNAL TRANSMISSION AND CONTROL SYSTEM

[76] Inventor: Robert E. Hartsock, 2025 Deep Canyon Road, La Habra, Calif. 90631

[21] Appl. No.: 649,192

[22] Filed: Jan. 14, 1976

[51] Int. Cl.² .......................... A01M 7/00; B05B 3/00
[52] U.S. Cl. .................................... 137/344; 239/212; 335/151; 340/325; 340/189 M
[58] Field of Search ................. 335/151, 154, 282, 2, 335/107, 153, 152; 340/58, 189 M, 271, 325; 307/117; 137/344; 239/177, 212, 213; 318/254

[56] References Cited

U.S. PATENT DOCUMENTS

| 2,798,987 | 7/1957 | Wiegand | 361/139 |
|---|---|---|---|
| 2,945,931 | 7/1960 | Reese | 335/154 |
| 3,013,137 | 12/1961 | Vanden Broeck | 335/152 |
| 3,053,951 | 9/1962 | Poinsot et al. | 335/154 |
| 3,218,506 | 11/1965 | Williams et al. | 335/154 |
| 3,238,525 | 3/1966 | Humphreys et al. | 310/34 |
| 3,250,866 | 5/1966 | Ryno | 335/152 |
| 3,289,131 | 11/1966 | Watkins et al. | 340/325 |
| 3,576,554 | 4/1971 | Temps et al. | 340/189 M |
| 3,592,220 | 7/1971 | Reinke | 137/344 |
| 3,643,248 | 2/1972 | Schott | 335/151 |
| 3,719,935 | 3/1973 | Chaney et al. | 340/189 M |
| 3,720,895 | 3/1973 | Schlesinger, Jr. | 335/154 |
| 3,780,947 | 12/1973 | Ririe et al. | 137/344 |
| 3,833,871 | 9/1974 | Fisher et al. | 335/282 |
| 3,836,078 | 9/1974 | Olson et al. | 239/177 |
| 3,923,249 | 12/1975 | Mortimer | 137/344 |
| 3,983,519 | 9/1976 | Stadigh | 335/151 |

Primary Examiner—William R. Cline
Assistant Examiner—H. Jay Spiegel
Attorney, Agent, or Firm—J. C. Baisch

[57] ABSTRACT

The present invention relates to a signal transmission and control system wherein a signal is transmitted from one member of co-acting members to another member; the signal being transmitted without mechanical contact — and being transmitted regardless of the spatial relation, the angular relation, or the relative motion of the members. The present invention may be designed to transmit various types of signals; and may be used as a remote control for controlling any of a variety of systems.

6 Claims, 6 Drawing Figures

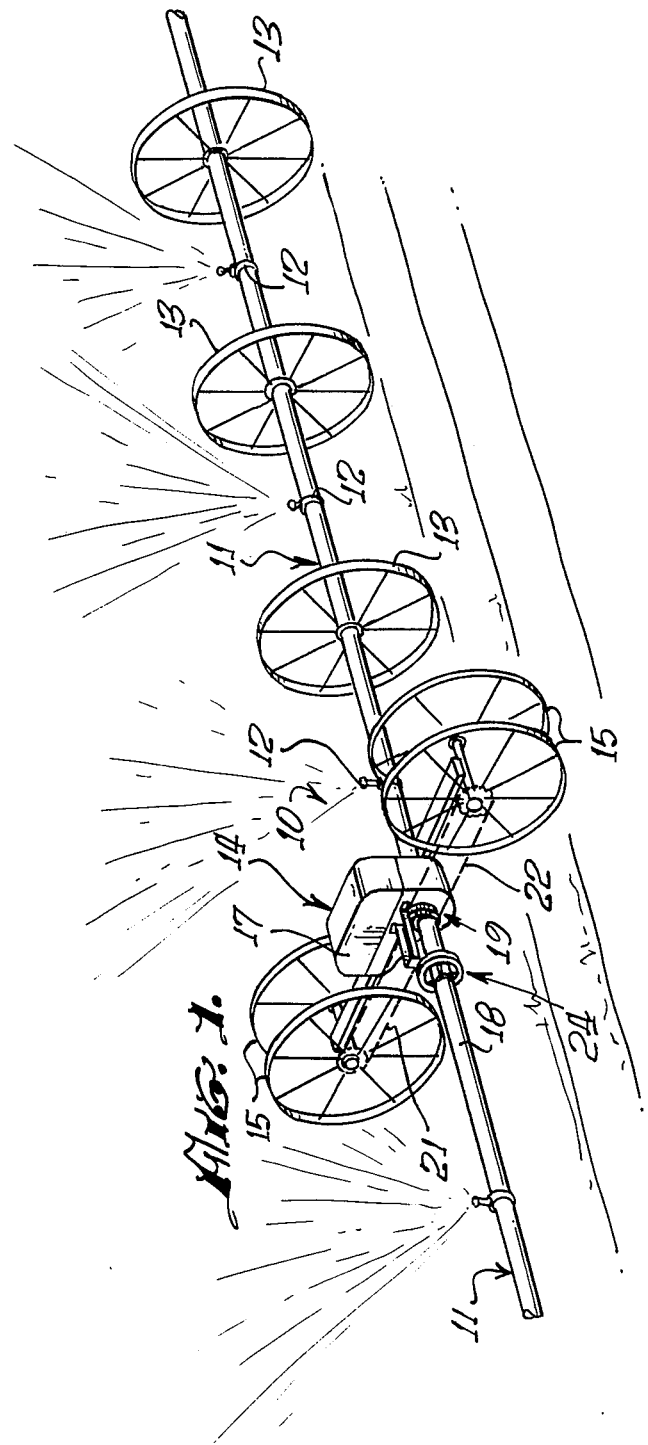
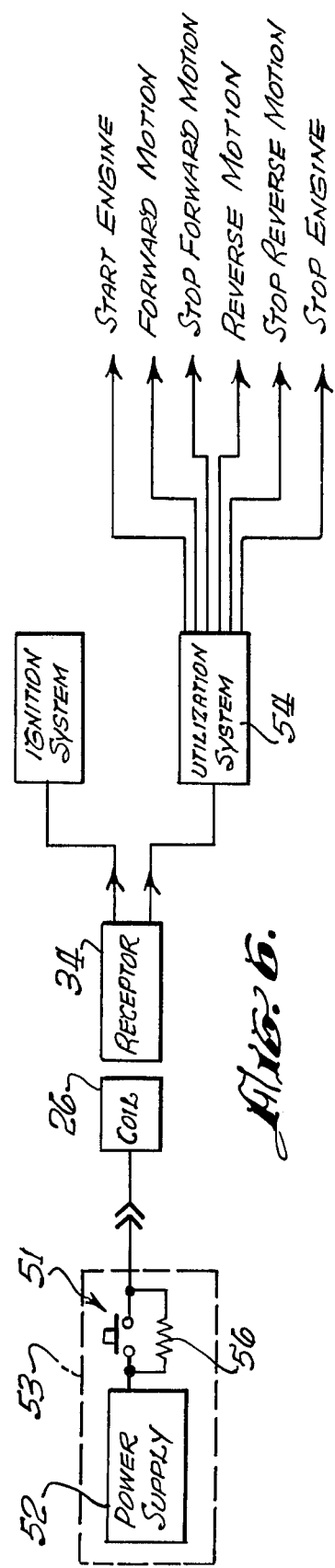

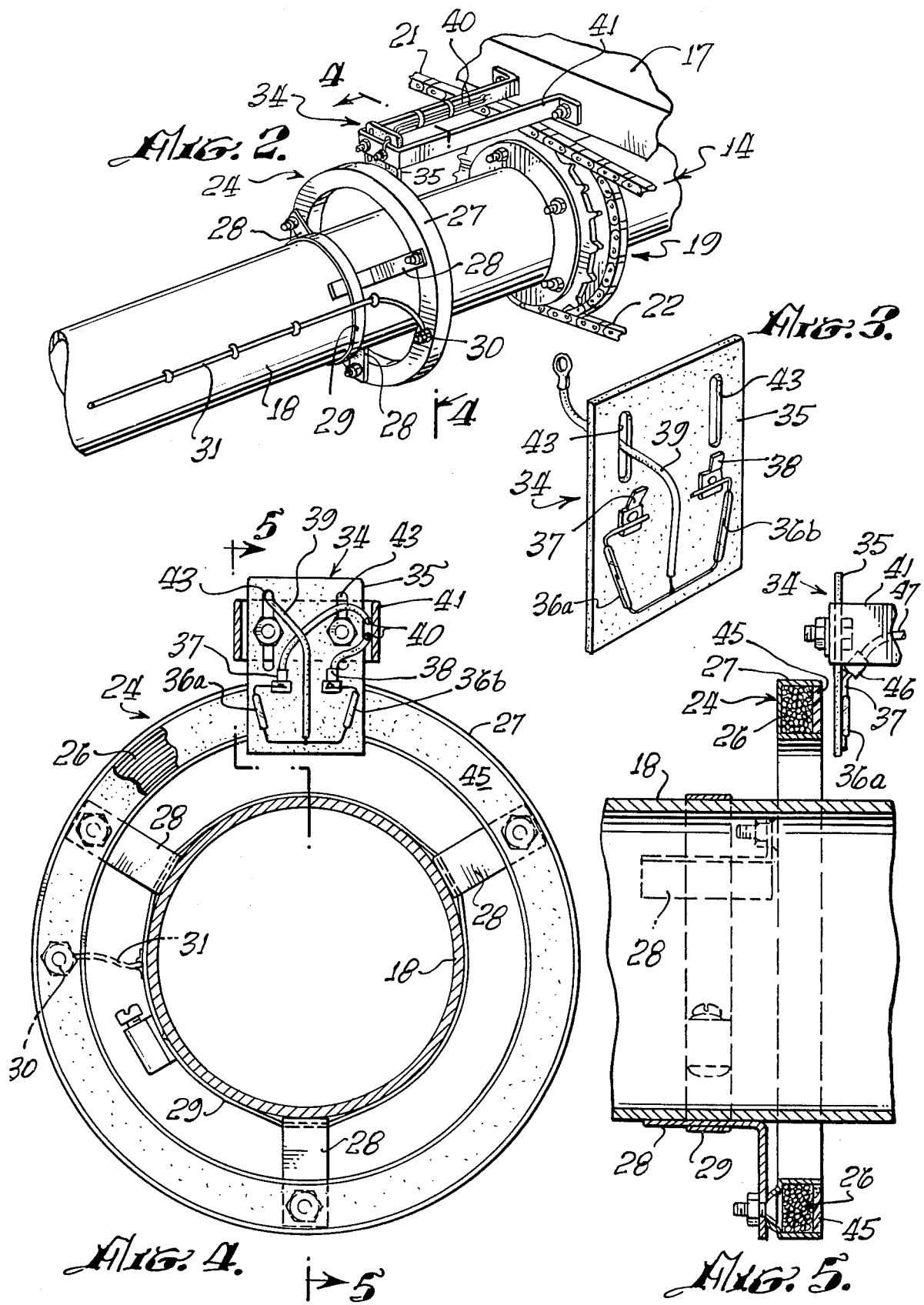

SIGNAL TRANSMISSION AND CONTROL SYSTEM

BACKGROUND

It is frequently necessary to transmit a signal between a pair of co-acting members, at least one of which may be moving or may be stationary relative to the other. This situation arises most frequently in structures wherein one of the members is rotatable relative to the other; so that the signal must be transmitted during rotating conditions and/or during stationary conditions.

There have been many attempts to solve this problem of signal transmission; but most of them have been unsatisfactory, for a variety of reasons — including cost, reliability, maintenance, short life-times, environment, etc.

The disclosed invention overcomes the disadvantages of the prior art systems in an economical manner that provide dependability, long life, freedom from spurious effects, maintenance, etc.

OBJECTIVES AND DRAWINGS

It is a principal objective of the present invention to provide an improved signal-transmission system.

It is another objective of the present invention to provide an improved signal-transmission system that provides dependability, long life, freedom from spurious effects, etc. at an economical cost.

It is still another objective of the present invention to provide an improved signal-transmission system that transmits a signal between a pair of co-active members, either one or both of which may be movable or stationary relative to the other member.

It is a further objective of the present invention to provide an improved signal-transmission system that utilizes a magnetic field for the transmission of the signal.

It is a still further objective of the present invention to provide an improved signal-transmission system for transmitting a signal between a pair of coacting members, one of which is rotating, and the other of which is stationary.

It is a still further objective of the present invention to provide an improved control-system wherein a signal is transmitted between a pair of co-acting members, for the control of the apparatus associated with said members.

The attainment of these objectives and others will be realized from the study of the following specification, taken in conjunction with the drawings, which:

FIG. 1 shows a farmland irrigation apparatus which may utilize the disclosed invention;

FIG. 2 shows a pictorial view of the present invention concept as utilized in the farmland irrigation apparatus of FIG. 1;

FIG. 3 shows a typical receptor used with the present invention;

FIG. 4 shows the present invention as viewed along the lines 4—4 of FIG. 2;

FIG. 5 shows a partially cross-section view of the present invention as viewed along the lines 5—5 of FIG. 4;

FIG. 6 shows a typical schematic-and-block circuit utilizing the disclosed invention.

SYNOPSIS

Broadly stated, the present invention is disclosed to produce a magnetic field that is concentric with a rotating member; and a magnetic-field detector is positioned on the non-rotating member in such a manner that it is always in a sub-field of the overall magnetic field. Thus, signals are transmitted through the magnetic field; and the occurance, disappearance, duration, direction, polarity, etc. of the magnetic field may be used to establish the characteristics of the transmitted signal. The disclosed invention can also be used when the co-acting members have linear or reciprocating relative motion.

INTRODUCTION

As indicated above, the present invention permits signals to be transmitted between two members — at least one of which is movable relative to the other. While the invention should not be construed to be limited to the illustrated apparatus, the following disclosure will be presented in terms of a farmland irrigating apparatus — since this apparatus and its usage displays the problems and the drawbacks of prior-art systems; and illustrates the advantage of the present invention.

FIG. 1 shows a pictorial view of a widely-used farmland irrigating apparatus 10; various forms thereof being available from sources such as Western Irrigating & Manufacturing Inc. of Eugene, Oregon, Sur-Rane Agricultural Irrigation Equipment of San Jose, California; A.M. Irrigation Products of Spokane, Washington; and others. As illustrated, the irrigator portion 11 comprises a string of water pipes that are coupled together in an end-to-end manner — these pipes usually being formed of aluminum, each pipe being about forty to sixty feet long, and having a diameter of five inches to seven inches. As many as forty pipes may be coupled together, to produce an irrigator 11 about one-quarter of a mile long.

As indicated in FIG. 1, the irrigator 11 has a plurality of sprinklers 12 located along its length; and these sprinklers are pre-set to deliver the desired amount and pattern of water.

Generally, one end (not visible in FIG. 1), of irrigator 11, is connected to a "riser" of a main water pipe that extends along one edge of the field; and when the riser valve of that particular riser is open, the water flows into the irrigator 11 and out of the sprinklers 12.

Ordinarily, the irrigating apparatus 10 is left at its watering location for about twelve hours; after which the water is shut off, the irrigator 11 is permitted to drain, and the irrigating apparatus 10 is moved ahead — about sixty feet — to the next riser of the main watering pipe. Here, the adjacent end of the irrigator 11 is connected as by a flexible hose or by a telescoping pipe, to the riser; and the water is turned on, so that the irrigator 11 may water this new location.

As may be realized, moving the one-quarter mile long irrigator 11 to the next watering location can be a problem. The most satisfactory solution has been to affix "remote" wheels 13 to the various sections of the irrigator 11; and to provide a prime mover 14, that is mounted on a suitable frame, and has driving wheels 15 about six or seven feet in diameter. The prime mover 14 has an engine — usually a gasoline engine — and either a mechanical or a hydraulic pump/motor system to cause the prime mover 14 to move. As the prime mover 14 advances, it causes the irrigator 11 and its coupled aluminum pipes to rotate; and their rotation causes the remote wheels 13 to rotate. In this way, the prime mover 14, the irrigator 11, and its associated remote wheels 13 move ahead to the next watering location.

Unfortunately, this moving operation is not always as smooth as it is suppose to be. For example, if the irrigator 11 is not uncoupled from the riser, the motion of the prime mover 14 would frequently twistoff a portion of the aluminum irrigator pipes. Also, due to friction, inertia, uneven terrain, etc., the prime mover 14 generally moves faster and farther than the remote wheels 13; and this causes the irrigator 11 to assume a progressively-more bowed formation — in which the sprinklers 12 are not all upwardly oriented. This problem is best corrected by stopping the foward motion of the prime mover 14 when the most-remote sprinklers 12 are upwardly oriented; and to then cause the prime mover 14 to now move in a rearward direction, until the irrigator 11 is again straight — with the sprinklers properly positioned atop the water pipe sections.

Many systems have been introduced for controlling the prime mover 14. Among these is one in which a person has to walk out to the prime mover — through the mud and water-soaked growth — to manually start, and control the movement of the prime mover. Another, "remote", system was to use radio control; but unless the electronic system was complex (and therefore expensive) it was subject to spurious signals from aircraft, door openers, radio transmitters, etc. Still another remote system was to use a "slip ring" and "brushes"; but this mechanical structure was sensitive to extreme wetness, to dust and grit, to vibration, etc. as a prime mover rolled over bumpy hillocks, undulating terrain, ditches, and the like.

While these prior art systems did work, there is a need for an improved system of remote control.

The present invention will be better understood by now referring to FIG. 2 which illustrates the portion of the prime mover 14 involving the frame 17 and a center watering pipe 18 that comprises the central section of the irrigator 11.

It has been found convenient, by one manufacturer, to form a center section of pipe 18 by use of a pipe rotating hub 19 to which the center pipe 18 is attached, as by bolting or the like. Another manufacturer chooses to use an integral length — about forty feet — of aluminum piping for the center section of the irrigator 11; this center section of pipe 18 being thrust through the pipe-rotating hub 19 of the prime mover 14, to extend about twenty-feet on either side. The center of pipe 18 is clamped to the movable hub 19 by any suitable means — such as a set of bolts — that, when tightened cause the rotation hub 19 to tightly clamp the center section of the pipe 18.

As indicated above, the prime mover 14 may move in either a forward or a reverse direction; so the engine of the prime mover 14 is usually coupled, as by a bull gear (not shown), to the pipe-rotating hub 19; and the hub 19 is then coupled to the driving wheels 15 by means such as chains 21 and 22.

Thus, the prime mover 14 may move forwardly or backwardly; and the associated irrigator and remote wheels will rotate in a corresponding direction.

MAGNETIC FIELD PRODUCING MEANS

A magnetic-field producing assembly 24 of FIG. 2 is mounted concentrically with the center pipe 18; assembly 24 comprising a torroidally-shaped coil 26 or wire (not visible in FIG. 2) that is positioned in a correspondingly torroidally-shaped housing 27 that has a U-shaped or channel-shaped cross section. Housing 27 is mounted concentrically with the pipe 18 by any suitable means such as welding, brazing, clamping, cementing or the like. FIG. 2 shows a simple mounting that permits an easy-on-the-job installation; the illustrated mounting comprising a plurality of L-shaped brackets 28 that have their upper end bolted to the back of the housing 27, and have their lower ends mounted onto the pipe 18 by means as a cable clamp 29. This arrangement permits the coil/housing assembly 24 to be mounted with minimal effort and maximal adjustment.

One end of the electrical-wire coil 26 in the housing 27 is electrically connected to housing 27 so that this end of coil 26 is electrically "grounded"; and the other end of the coil 26 is electrically connected to a terminal 30 that is electrically insulated from the housing 27.

ENERGIZING THE COIL

In order to energize the coil 26 from a remote dry location near the main water line, an external control wire 31 is connected to the insulated terminal 30; and the other end of the control wire 31 is made available to an operator at the remote station. Wire 31 may be handled in two different ways. First of all, (as shown in FIG. 2) it may be taped or otherwise attached to the exterior of the irrigator 11. Alternatively, the wire 31 may be threaded through a hole in the pipe 18, and terminated at the remote station. In either case, at the remote station, the end of control wire 31 is connected to an insulated terminal. It has been found desirable that the end terminal for wire 31 to be of the telephone-plug type that comprises a second connection that is electrically connected to the pipe — for grounding purposes. In this way, the coil 26 may be remotely energized to produce a magnetic field.

THE RECEPTOR

The system also comprises a receptor 34 that is adapted for detecting the presence of the absence of the magnetic field; for producing suitable output signals.

While the various magnetic-sensitive devices may be used, one particularly effective type of magnetic field detector is an element known as a "magnetic reed switch" that may be obtained from the Hamlin Reed Switch Company of Lake Mills, Wisconsin. The reed switch comprises an evacuated glass envelope about one inch long and about one-eighth inch in diameter; and this envelope contains two electrically conductive "reeds", at least one of which is capable of being moved by a magnetic field.

One form of reed switch is the "normally open" type; this means that the reeds are normally separated from each other, and, therefore, do not normally conduct electricity — thus producing an "open" electric circuit. When such a reed switch is in a magnetic field of suitable strength, one or both reeds move into contact with each other; and the now-contacting reeds conduct electrically — thus producing a "closed" electric circuit. When the influence of the magnetic field is removed, or reversed, the reed switch resumes its normal open condition.

Another type of reed switch is the "normally closed" type wherein the reeds are normally in contact with each other, to produce a "closed" electric circuit. In this type of switch, the magnetic field causes one reed to move away from the other, to produce an open electric circuit.

Other types of reed switches, and other devices, are also available; a particular type being selected in accordance with requirements of the utilization device.

Thus, one or more reed switches may be used to detect the presence or the absence of a magnetic field, and to open or close electric circuits to produce output signals that depend upon the type of reed switch, the presence or absence of the magnetic field, the initiation or the termination of the magnetic field, etc.

FIG. 3 shows a typical receptor 34 having an insulative mounting board 35 onto which is mounted one or more (two in the illustrative case) reed switches 36a and 36b. A wire of each reed switch 36 is electrically connected to individual terminals 37 and 38 respectively; from here the output signals from the reed switches 36 can be applied through the wires 40 to suitable utilization devices.

FIG. 3 also shows the receptor 34 to have a third wire 39 electrically connected to the common junction of the two reed switches 36. This third wire 39 is used as a ground connection.

OVERALL STRUCTURE

FIG. 4 shows a back view of the overall structure, including the coil/housing assembly 24 and the receptor 34. It will be seen that the center pipe 18 has the L-shaped brackets 28 mounted thereon by means of cable clamp 29; the upper ends of brackets 28 being used to hold the housing 27 in a concentric relation with the center pipe 18. Within the housing 27, is a multiturn wire coil 26 that produces a magnetic field when the wire coil 26 is energized. This magnetic-field-producing assembly 24 rotates along with the pipe 18.

The open circular mouth of housing 27 has a concentrated magnetic field thereat, and this may be understood from the following discussion.

It is well known that a horseshoe magnet is one of the most powerful forms; because the horseshoe configuration minimizes the loss of magnetic strength from the back of the magnet, and concentrates the magnetic field at the space between the ends of the horseshoe configurations. In the present embodiment, the channel configurated torroidal housing 27 is formed of a magnetic material, and functions in the same manner as the horseshoe magnet type; concentrating the magnetic field at the mouth of the coil/housing assembly 24.

The receptor 34 is mounted to a non-movable portion of the prime-mover frame 17 by means of a bracket 41; the receptor 34 being carefully positioned so that the two reed switches 36 are across the open mouth of the housing 27.

It should be noted that there is a substantially equal-strength magnetic "sub-field" across each elemental portion, or magnetic space, of the housing mouth; and that the mouth of the circular housing is concentric with the axis of rotation of the pipe 18. Therefore, regardless of the angular orientation of the coil/housing assembly 24, a substantially equal-strength magnetic sub-field is presented to the nonmovable receptor 34; and this condition holds whether the pipe 18 — and the coil 26 — is rotating clockwise, is rotating counter clockwise, or is stationary.

Thus, the instantaneous magnetic area at which the receptor 34 happens to be located, is always exposed to a magnetic space having substantially the same strength magnetic sub-field. In this way, dependability is improved.

As previously indicated, the grounding wire 39 of the receptor 34 is to be grounded to the metal frame; and this result is best accomplished by passing the ground wire 39 through one of the adjustment slots 43 to the front of the bracket 41 where the terminal of the grounding wire 39 may be positioned between the metal bracket 41 and its fastening bolt — thus connecting the grounding wire 39 between two metalic elements to assure optimal grounding.

Alternatively, the grounding wire 39 of the receptor, and the ends of the reed switch lead-wires may terminate in the type of terminal that accepts a socket 46 of FIG. 5; and these three wires may then be connected, as a cable 47, to a suitable portion of a utilization device.

FIG. 5 shows a partially cross-sectional view of the pipe 18, the coil/housing assembly 24, and the receptor 34. Here, the channel-like configuration of the housing 27 is apparent, as are the wires of the multi-turn coil 26. This figure also indicates the coil 26 to be sealed into the housing 27 by means of a suitable sealing agent 45, epoxy, or the like; in order to hold the coil in the housing — and to protect the coil from external influences such as dirt, grit, water, abrasion, etc.

FIG. 5 also shows the receptor 34, its mounting board 35, and one of the reed switches 36a; the wires in this case being accommodated in a socket 46 whose cable 47 leads the three wires to a utilization device.

Since the magnetic sub-fields produced by the coil/housing assembly 24 are of substantially equal strength, the reed switches 36 can be spaced away from the magnet face sufficiently to meet environmental requirements without requiring excessive power.

OPERATION

A typical operation of the present invention may be understood from the schematic-and-block diagram of FIG. 6. This shows a control switch 51 and a power supply 52, which may be a battery; both being located in a hand-held control box 53 that the operator uses for remote control. When the control switch 51 is closed, the coil 26 is energized by the power supply 52; producing the magnetic field discussed above. Upon the occurrence of this magnetic field at the magnetic area in which the receptor 34 happens to be located at that instance, the normally-open reed switch 36a closes, as discussed above — regardless of the angular orientation of the coil/housing assembly 24, and regardless of whether this assembly is stationary or rotating. The output from receptor 34 is applied to a signal distribution unit, or utilization device 54, that in the present explanation, controls the operation of the prime mover.

The utilization device 54 may take any of a number of forms, depending upon its input and output requirements. One particularly simple and satisfactory distribution unit is a rotary stepping switch available as a "Rotomite Stepper" from The Guardian Electric Manufacturing Company of Chicago, Illinois. This type of switch "steps" ahead each time that a signal is applied to it; and has a number of individual outputs.

In the illustrated embodiment, when the control switch 51 is first closed, coil 26 is energized to produce a magnetic field; and a signal is transmitted from the stationary coil 26 to the stationary receptor 34. The first reed switch 36a, for example, of the normally open type; and it closes to produce an output signal that causes the stepper switch to step to its first position; at which it produces an "engine start" signal that is applied to the engine starting circuit of the prime-mover engine. Once the engine has started, the control switch 51 is closed again, and a second signal is transmitted from the stationary coil 26 to the stationary receptor 34. This second reed-switch signal produces an output that causes the stepper switch to step to a second position; at which it produces a "forward" signal that activates the prime-mover to move forward.

When the prime-mover, irrigator, and the associated remote wheels have moved to the desired location, (meanwhile assuming a bowed irrigator formation), the control switch 51 is closed again; and the forwardly rotating coil 26 transmits a signal to the stationary receptor 34. The stepper switch now produces a "stop movement" signal that stops the movement of the prime mover — retaining, however, the bowed irrigator formation.

The next control-switch closure causes the stationary coil 26 to transmit a signal to the stationary receptor 34. The stepper switch now produces a "reverse movement" signal; and the prime mover moves rearwardly to correct the irrigator bowed formation, and to provide a straight-line irrigator formation with all of the sprinklers in an upright orientation.

The control switch next causes the rearwardly rotating coil 26 to transmit a signal to the stationary receptor 34. The step switch now produces a "stop reverse" movement signal; and the prime mover stops at the straight line formation.

The next control signal causes the stepper to produce a "stop engine" signal that turns off the engine, as by disabling the ignition system. The functions associated with these signals are implemented in ways that are suitable for the given prime mover engine.

Now, the irrigator may be connected to the riser, and the riser valve opened; so that the new location may be watered.

If desired, the control box and stepper switch and the utilization device may be designed to steer the prime mover, and to perform other desired functions; or to control other apparatus.

If the control-wire 31 should break — as when a section of pipe breaks — it becomes desirable to immediately shut down the prime mover engine, to prevent an uncontrolled runaway situation. In one particular usage, wherein the prime mover engine uses a "magneto ignition system ", this result may be achieved as follows.

Receptor 34 is designed to include a second reed switch 36b of the normally closed type — this reed switch having its own characteristics that are different from the characteristics of the first reed switch 36a.

When the control box 53 is first connected, a "bleed" resistance 56 of FIG. 6 permits a small predetermined "bleed" electric current to immediately flow through coil 26.

When the control switch 51 is closed, as explained above, a large electric current flows through coil 26 to produce a stronger magnetic field that affects the first reed switch 36a as discussed above; and this increased strength magnetic field opens the normally-closed second reed switch 36b. The "bleed" electric current acts as a holding current that causes the second reed switch 36b to remain open to maintain the operative "enabled" state of the magneto ignition system.

When the prime mover is satisfactorily positioned for watering the next location, the control box 53 is disconnected; and this terminates the flow of the bleed-resistance current — so that the second reed switch 36b now resumes its normally-closed state, to "ground", or disable the magneto ignition system.

Thus, the disclosed invention may be used for transmitting a signal between members that are moving or stationary relative to each other; and by selecting detectors of suitable characteristics and number, a variety of functions may be remotely controlled.

MISCELLANEOUS

It is apparent that, for some applications, the elements of the disclosed invention may be physically reversed; that is, the coil/housing assembly 24 may be mounted on the non-movable member; and the receptor 34 may be mounted on the movable member. Since, under this reversed arrangement, the receptor will still always be in substantially equal-strength magnetic sub-fields at the mouth of the housing, the operation will be the same as described above.

Moreover, there may be usages wherein there is a linear or a reciprocating relative motion between the co-acting members; and in usages such as these, the principles of the disclosed invention are still applicable.

SUMMARY

The disclosed invention has innumerable advantages over prior art systems. First of all, it is extremely reliable. It requires no maintenance, It is long lived. It is economical. It may be retrofitted onto existent apparatus. It may be adapted to various types of equipment. It operates regardless of the angular relation, the relative motion, or the nonmotion of the members. It can transmit various types of signals. It can be remotely controlled. It is practically immune to rough handling or use. It does not use mechanical contact; so it obviates problems of wear, erosion, grit and dust, wetness, electrical arcing, and continuous maintenance. It does not use radio waves; so that it is not affected by spurious signals.

I claim:

1. A signal transmitting system adapted to transmit a signal between coacting members, at least one of said members being movable relative to the other member, comprising:

means for producing a single-pulse magnetic field having magnetic sub-fields of substantially equal magnetic strengths at each magnetic space of said magnetic field-producing means;

means, ccomprising a magnetic reed switch, for detecting the presence or the absence of said single-pulse magnetic field;

means for mounting said magnetic-field-producing means on one of said members;

means for mounting said detecting means on the other of said members, for causing said detecting means to always be exposed — during the existance of said single-pulse magnetic field — to one of said equal strength magnetic sub-fields regardless of the instantaneous spatial relation and relative movement between said members;

said magnetic-field-producing means comprising a multi-turn coil of electric wire positioned in a torroidally shaped housing of magentic material having a channel configuration;

means comprising said channel housing of magnetic material, for concentrating magnetic flux to provide increased magnetic strength at the magnetic spaces of said magnetic field producing means.

2. The invention of claim 1 wherein said magnetic reed switch is positioned closely adjacent to the open mouth of said channel-configurated torroidally-shaped housing;

said magnetic reed switch being thus located in said concentrated magnetic field.

3. A signal transmitting system adapted to transmit a signal between coacting members, at least one of said members being movable relative to the other member, comprising:

means for producing a single-pulse magnetic field having magnetic sub-fields of substantially equal magnetic strengths at each magnetic space of said magnetic field-producing means;

means, comprising a magnetic reed switch, for detecting the presence or the absence of said single-pulse magnetic field;

means for mounting said magnetic-field-producing means on one of said members;

means for mounting said detecting means on the other of said members, for causing said detecting means to always be exposed — during the existance of said single-pulse magnetic field — to one of said equal strength magnetic sub-fields regardless of the instantaneous spatial relation and relative movement between said members;

said magnetic-field-producing means being attached to a rotatable shaft;

said substantially-equal-strength magnetic sub-fields being equidistant from the rotational axis of said rotatable shaft;

and said magnetic detector being mounted in a fixed location relative to the axis of rotation of said magnetic-field-producing means, and positioned adjacent to said sub-fields.

4. In combination with a farmland irrigating apparatus having a frame; an engine, mounted on said frame for powering the movement of said apparatus; a set of driving wheels for permitting movement of said apparatus; and a rotatable hub adapted to fasten a central irrigating pipe thereto, said pipe being adapted to rotate about its longitudinal axis; the combination comprising:

a magnetic-field-producing multi-turn wire coil mounted on said rotatable pipe;

said coil being mounted to rotate with said pipe, and to produce a magnetic field that is substantially concentric with the axis of rotation of said pipe;

means for detecting the magnetic field produced by said coil regardless of the angular orientation of said coil, and regardless of whether said coil is rotating or is stationary;

said detector comprising a magnetic-reed-switch;

means for mounting said magnetic-reed-switch on said frame, and positioned in the magnetic area of said coil;

means, comprising a control box, for remotely energizing said coil;

whereby when said control box energizes said coil, the magnetic field from said coil causes said detector to produce a signal;

means for utilizing said signal from said detector.

5. The invention of claim 4 wherein said utilization means is adapted to start and stop said engine, to cause the apparatus to move forward and backward, and to stop the movement of said apparatus.

6. The invention of claim 4 including a second magnetic-reed-switch mounted on said frame, and positioned in the magnetic area of said coil;

whereby when said control box energizes said coil, the magnetic field from said coil causes said second magnetic-reed-switch to produce a signal;

means for causing said signal from said second magnetic-reed-switch to enable and to disable a magneto-type ignition system.

* * * * *